(12) United States Patent
Vecchiet et al.

(10) Patent No.: US 7,258,831 B2
(45) Date of Patent: Aug. 21, 2007

(54) INJECTOR-BURNER FOR METAL MELTING FURNACES

(75) Inventors: Fabio Vecchiet, Villa Vicentina (IT); Milorad Pavlicevic, Udine (IT); Alfredo Poloni, Fogliano Redipuglia (IT)

(73) Assignee: Danieli & C. Officine Meccaniche S.p.A., Buttrio (IT)

( * ) Notice: Subject to any disclaimer, the term of this patent is extended or adjusted under 35 U.S.C. 154(b) by 432 days.

(21) Appl. No.: 10/520,807

(22) PCT Filed: Jul. 9, 2003

(86) PCT No.: PCT/EP03/07431

§ 371 (c)(1), (2), (4) Date: Jan. 10, 2005

(87) PCT Pub. No.: WO2004/007776

PCT Pub. Date: Jan. 22, 2004

(65) Prior Publication Data

US 2006/0038326 A1 Feb. 23, 2006

(30) Foreign Application Priority Data

Jul. 11, 2002 (IT) .......................... MI2002A1526

(51) Int. Cl.
*C21C 5/52* (2006.01)
(52) U.S. Cl. ........................ 266/186; 266/216; 266/44; 266/200
(58) Field of Classification Search ................ 266/225, 266/222, 216, 200, 186, 44
See application file for complete search history.

(56) References Cited

U.S. PATENT DOCUMENTS

| | | | | |
|---|---|---|---|---|
| 3,266,552 | A | * | 8/1966 | Denis .......................... 239/430 |
| 3,578,793 | A | * | 5/1971 | Jones et al. .............. 239/132.3 |
| 4,077,614 | A | * | 3/1978 | Udo et al. ................... 266/159 |
| 4,497,475 | A | * | 2/1985 | Fuchs et al. ................. 266/270 |
| 5,871,343 | A | * | 2/1999 | Baukal et al. ................. 431/10 |
| 6,289,677 | B1 | | 9/2001 | Prociw et al. |
| 6,322,610 | B1 | | 11/2001 | Pavlicevic et al. |
| 6,450,799 | B1 | | 9/2002 | Mahoney et al. |
| 6,514,310 | B2 | * | 2/2003 | Allemand et al. ............ 75/414 |

FOREIGN PATENT DOCUMENTS

GB    2 064 094    6/1981

\* cited by examiner

*Primary Examiner*—Len Tran
(74) *Attorney, Agent, or Firm*—Sampson & Associates, P.C.

(57) ABSTRACT

The following invention relates to an injector-burner for applications in the metalwork field, in particular for use in electric arc furnace melting processes having a frontal head with two series of holes arranged in two concentric crowns, the inner crown of holes used to feed fuel and the outer crown used to supply a supporter of combustion. A central hole is also provided, which is fitted with an oxygen injection nozzle. The holes of the two crowns are divided into groups separated by circular sectors without holes, in order to create a number of flames and are inclined in such a way as to give the gases supplied, and consequentially the flame generated, a rotation around the injector-burner axis. By regulating the flow-rates of the fuel and the supporter of combustion supplied to the various holes, the injector-burner is able to regulate the flame shape in burner mode and also in injection mode, thus guaranteeing optimum performance in all modes.

35 Claims, 10 Drawing Sheets

INJECTOR-BURNER FOR METAL MELTING FURNACES

This application claims priority to PCT/EP2003/007431 entitled Injector For Metal Melting Furnaces, filed on 9 Jul. 2003, which claims priority to Italian Patent Application No. MI2002A001526, filed on 11 Jul. 2002.

TECHNICAL FIELD

The following invention relates to a multipurpose oxygen injector with built-in burner (hereinafter referred to as injector-burner) for use in the metallurgy either for the heating and metallurgical processing of metals or as an aid to other metal heating and metallurgical processing appliances used in melting. The injector-burner may additionally though not exclusively be used in electric arc furnaces (or EAF).

The device can be fixedly wall-mounted above the level of the liquid metal bath. In certain applications, it can also be moved towards the interior of the furnace in order to reduce the distance from the bath.

A method for use of this device for melting processes in electric arc furnaces is also disclosed.

BACKGROUND ART

Many systems for oxygen injection from furnace walls are known. A number of such systems make use of an additional flame to regulate the initial heating and melting of the metal charge, which is usually activated by natural gas as the fuel and oxygen as the supporter of combustion.

The drawback of the models currently available is that the devices described do not allow varying the shape of the flame at will in the various melting procedure phases.

At the start of the melting process, a diffuse and wide flame is notably needed in order to uniformly distribute a large chemical power throughout the solid charge. Subsequently, a concentrated flame mode is required, which is adapted to transfer heat to the residual solid charge below the injector installation level.

No state of the art injection device is known which is adapted to regulate the shape of the flame between these two opposite typologies. In particular, electric arc furnaces, hereinafter referred to as EAF, in which the state of the art injectors are used, suffer from bad heat distribution. The type of burners (and injectors in burner mode) typically used in EAF produce a concentrated flame that produces somewhat inefficient blending and oxidises the charge in the initial phases of the melting process.

When used in burner mode, the known injectors present large fractions of free oxygen in the flame, a characteristic that, combined with the strongly localised heating effect of the flame on the charge, makes them machines suitable for oxygen lance cutting the metal charge, but not for heating it uniformly. The oxidation of the charge in the initial phases of the melting process causes serious losses to the global energy balance as well as a drop in the final metallic yield.

Further drawbacks of this type of device are caused by the concentration of the flame produced. The volume of the heated metal charge remains limited, whereas the perforation of the charge as far as the electric arc area is a frequently observed phenomenon, which results in the disturbance of the arc and causes the burnt gases to rise up along the electrode without passing through the charge, to which heat is not transferred efficiently. Moreover, the ring of metal charge at the base of the column present in the furnace is preheated in a discontinuous way, with the consequence that the furnace must contain a greater number of injectors.

In addition to these limits in burner mode, the injectors currently available are also not efficient in the injection of supersonic oxygen, carbon and lime.

The installation of such injectors on the walls of EAF requires that the jets produced by the injector are coherent, at least with regards to the distance between injector and liquid bath. This characteristic is not satisfied by the state of the art devices when the installation distance from the bath is greater than 750 mm. As a consequence, the oxygen, carbon and lime injections into the liquid bath and the slag are inefficient, with a consequential lengthening of refining times and the thermal overload of the internal volume of the furnace and the fume system caused by the reagents dispersed above the bath.

No state of the art injectors are known which are adapted to injecting fuel such as methane into the slag and/or molten bath in order to give a carburation reaction of the bath and simultaneously develop heat and reduce the oxides in the slag.

Patent documents GB-A-2064094 discloses a burner having holes through which fluent fuel can be discharged within an outwardly divergent envelope and further passages encircling the first passage through which an atomising fluid can be discharged into the fuel as it leaves the burner head. U.S. Pat. No. 6,289,677 discloses a fuel injector for a gas turbine engine with a nozzle tip including an annular array of air passages spaced radially from a central fuel injector passage. The axes of the passages are arranged so as to permit mixing of air and fuel. A second annular array of air passages is provided to produce a circular shape of the flame.

The shape of the flame produced by such burners of the known art is circular and not suitable for hitting a surface from above whereby part of the energy is dissipated above the surface. Furthermore it cannot eject gas at supersonic velocity.

SUMMARY OF THE INVENTION

A new type of injector burner has been developed, in particular for use in the metallurgy field, more precisely, for melting furnaces such as electric arc furnaces. The primary aim of the present invention is to solve the above mentioned drawbacks of the state of the art, by creating a multi-purpose injector-burner capable of satisfying the requirements of each phase of the process and improving the energy balance, productivity and performance of the furnace in which it is used.

The injector-burner according to the invention comprises a cylindrical body defining a first longitudinal axis, the cylindrical body comprising a first central duct arranged along said axis, at least one second, ring-shaped duct, arranged around said central duct, a third ring-shaped duct, arranged around said second duct, a head, fixed to one end of said body and provided with at least one first through hole, coaxial to the first longitudinal axis and connecting said first central duct with the outside of the injector-burner, the head being provided with second and third through holes connecting respectively said second and third ring-shaped ducts with the outside of the injector-burner, each second through holes defining second respective axes, each second respective axis forming a first angle with a plane passing through the first axis and the intersection point of the respective axis with the external surface of the head and furthermore each second respective axis defining a projection on said plane, forming a second angle with said first axis, wherein the second and third holes are divided into several groups, the groups being reciprocally separated by circular sectors of the external surface of the head without holes, whereby the circular sectors have their apex on the first axis and their angles are greater than the angular distance between two adjacent second holes.

The first hole is coaxial with the cylindrical body. A third ring-shaped duct is arranged around said second duct and the head is provided with third holes connecting said third duct with the outside. Said third holes each have their own axis forming a first angle with a plane passing through said first axis and the point of intersection of the hole's axis with the external surface of the head (intended as the continuation of said surface not considering the presence of the first hole) and having a projection on said plane forming a second angle with said first axis of the cylindrical body.

Said first angles and said second angles of the second and third holes can advantageously be between 5 and 60°, the first and second angles of the second holes may also be different from those of the third holes. The latter is preferably such that the axes of the second and third holes, in pairs, cross over one another outside the burner. For making some particular embodiments like those for a flat, or fan-shaped, flame the second angles can also be of value zero for some holes. Being the holes adapted to emit jets of gases supplied to the injector-burner's ducts, this device allows a good blending of the gases originating from the second and third holes, which should preferably be arranged on circular crowns concentric with the first axis of the cylindrical body. They are divided into more groups spaced out by circular sectors of the head without holes. Said sectors are defined between two sides of an angle having the vertex at the centre of the head (intersection between the axis of the cylindrical body and the outer surface of the head), which is greater than the angle with its apex at the centre of the head, and having as sides the straight lines passing through said centre and the centres of the two adjacent second or third holes, if present. Two or more of such groups may be present.

Advantageously, the orientation of the axes of the burner second and third holes with respect to the axis of the burner itself is chosen in order to generate divergent flames and flame envelopes of various shapes. The shape can be chosen in view of an optimal heat distribution in the scrap layer during the whole stage of scrap melting.

A particularly advantageous flame shape is the one with a flat and wide flame envelope. This solution offers an optimal use of the heat produced, whereby the cavity produced by the flame of the burner lasts for a longer part of the scrap melting phase, before an aperture is produced in the part just above the flame. Avoiding such an aperture above the flame is an important advantage, as through this aperture part of the heat flows directly in the upper furnace atmosphere without thermal exchange with the scrap.

Such a shape of the flame is produced by an appropriate selection of the angles of inclination of the axes of each hole or group of holes made on the burner head. In this case two first groups of holes, set on the head symmetrically and opposite to each other with respect to the head axis, have hole axes skewed in such way that first angles have values comprised between 5° and 60° and second angles have a value of substantially 0°, i.e. the hole axes are coplanar with the head axis and substantially intersect the burner axis. Additionally two second groups of holes have respective axes skewed in such a way that first and second angles have values different from 0° and are thus not coplanar with the burner axis. The two symmetrical flames ejected by the second group of holes interact with each other and with the flames ejected by the first groups of holes and produce altogether a flame envelope corresponding to a unique, wide and approximately flat flame.

The first duct, or the corresponding first hole, can have a converging or converging-diverging nozzle shaped part, for regulating the expansion of the gas flowing in the duct, from the supply pressure to the output pressure. Inside the first duct, a further fourth duct may be present and preferably, coaxial with it, in order to supply solid or liquid components, preferably dispersed in a gas, for example the powders required by the process which are transported by a gas such as air or oxygen.

The invention also relates to a method for introducing gas into a metal melting furnace, in particular electric arc furnaces, including the introduction of gases to an injector-burner as described above.

The invention also relates to a method for heating and/or treating metal material in a melting furnace, in particular electric arc furnaces, comprising the supply of a gas containing oxygen to the first duct of an injector-burner as described above, a gas containing a fuel to the second duct, e.g. methane or natural gas, and a gas containing oxygen to the third duct, where present.

The invention also relates to a further method of processing the metal in a melting furnace providing the injection of a fuel such as methane in the molten bath also through the first duct of the injector-burner.

Thanks to the characteristics concerning the conformation of the holes on the head, the injector-burner may produce a flame of varying shapes according to the requirements of the various phases of the melting process when used in burner mode.

It is also able to function in oxygen injection mode (even in supersonic regime) and in the various production forms, it can also operate the injection of solid powdered or granule material, such as carbon or lime.

The device solves the state of the art typical drawbacks, as it can work in burner mode during the melting phase, creating a diffuse flame in the process' initial phase and a concentrated flame in the concluding phase of melting and subsequently working in supersonic oxygen or carbon or lime injector mode in the liquid bath refining phase.

The changeover between these injection and combustion different phases and modes takes place by simply regulating the flow-rates in the various injector nozzles.

Another advantage obtained is the ease with which the injector-burner of this invention can replace the state of the art injectors or burners in common melting furnace installations, thus obtaining considerable cost savings.

The injector is composed of a cylindrical body manufactured from very simply constructed concentric tubes connected to a cylindrical head, for example in copper. This injector is therefore compatible with existing installations, and can replace injectors of the known type without requiring alterations to the housings of such machines on the furnace walls.

Alternative set-ups that do not divert from the spirit of this invention are also obviously possible.

In the fixed installation mode, the injector-burner can be wall-mounted in the same way as the state of the art, or on the platform of the EBT (eccentric bottom tapping), i.e. the typical eccentric area of modern melting furnaces from which the tapping of the molten mass takes place at the end of the process.

Installation in this area of the melting furnace makes it possible to exert the heating and treating action of the liquid mass in an area of the furnace that is usually cool, which is critical to the speed of melting operations.

It can also be advantageous that the injector-burner is mobile in relation to the furnace, in order to be moved towards the interior during the melting and refining of the molten mass inside the furnace.

BRIEF DESCRIPTION OF DRAWINGS

Further characteristics and advantages of the finding will be further evident in view of the detailed description of a preferred, though not exclusive, embodiment of a burner for an electric arc melting furnace such as illustrated by way of non limiting example with the aid of the appended drawings wherein.

DETAILED DESCRIPTION OF THE PREFERRED EMBODIMENTS

Figure 1:
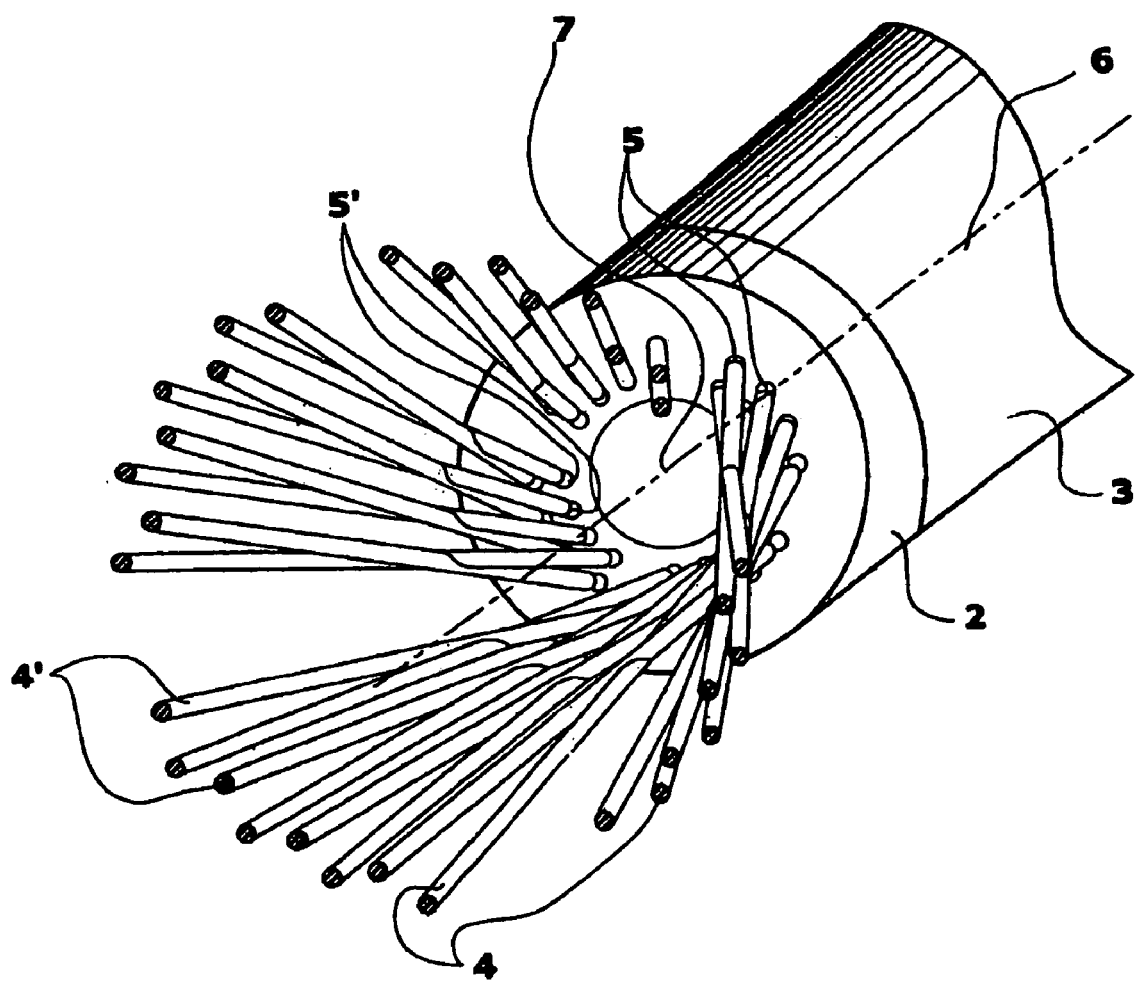
FIG. 1 illustrates a front view of the type of injector-burner according to the invention.

With reference in particular to FIG. 1, the front view of an injector-burner for the production of heat and for metallurgic treatment in an electric arc furnace is shown, which comprises a head 2, manufactured from suitable material, usually copper and a cylindrical body 3. The head 2 has a plurality of holes arranged along circumferences or circumferential arches concentric to the axis of the head and the burner. The cylindrical body 3 of the burner 1, defines an axis 6 and is constituted by more coaxial tubes inside one another. The directions 4 and 4' of the axes of holes 5 and 5' of the second and third holes respectively are shown. Each axis of holes 5 and 5' is skewed with respect to the axis 6, so as to define two angles:

i) angle α, different from zero, defined as the angle between the projection of the axis of hole on a radial plane, passing through the axis 6 and through the centre of the hole, and the axis 6 of the body 3;

ii) angle β, defined as the angle at which the axis of the hole crosses a radial plane passing through the axis 6 and through the centre of the hole.

As shown in FIG. 1, the axes intersect each other preferably in groups of two, they open outwards and they have a tangential component in relation to the axis of the injector-burner. By supplying fuel to the second holes and a supported of combustion to the third holes (or vice versa) flames will be obtained which rotate around axis 6 of the cylindrical body 3, producing a swirling effect. The first hole 7 is also visible.

Figure 2:
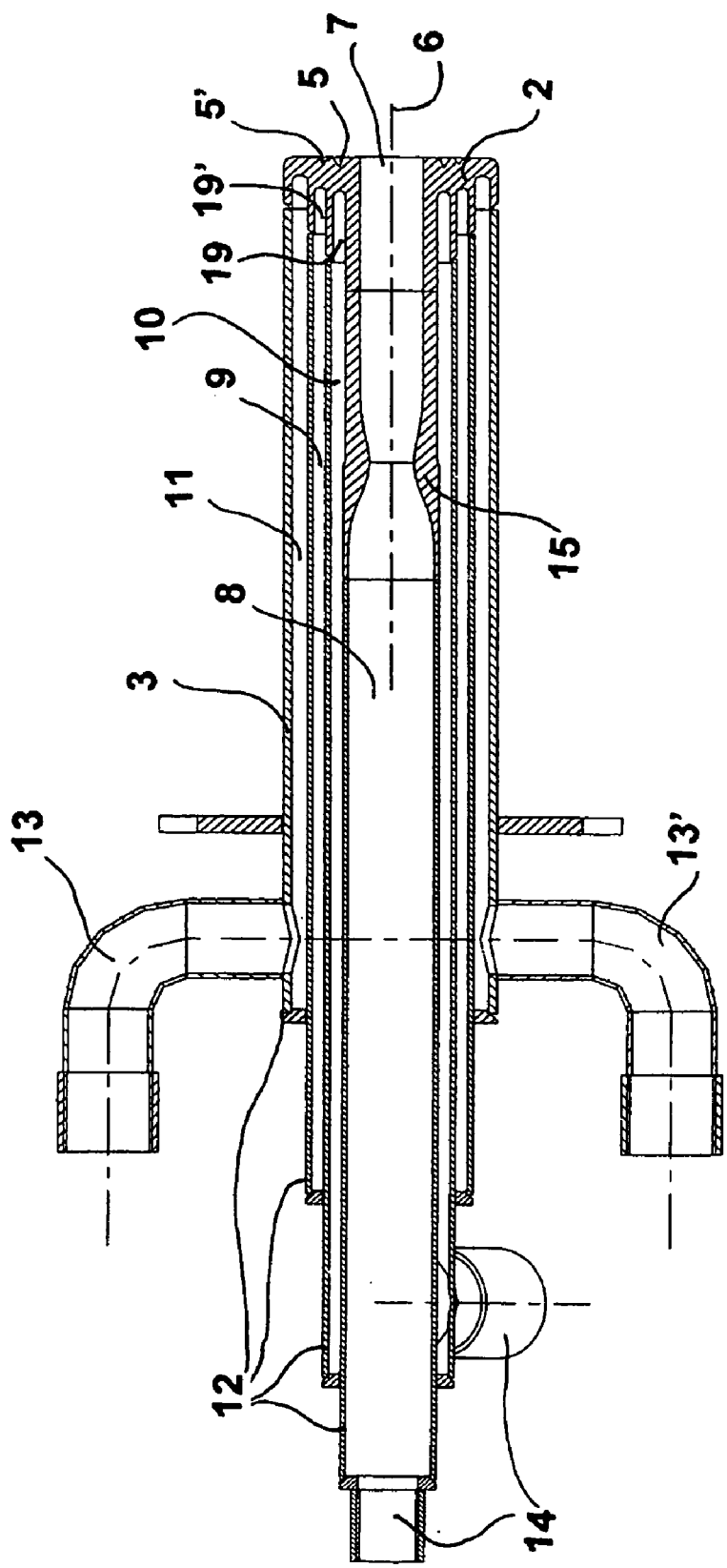
FIGS. 2, 3, 4 and 5 illustrate longitudinal section views of the injector-burners according to various aspects of the present invention.

FIG. 2 illustrates a longitudinal section of an injector-burner manufactured according to a possible embodiment of the invention. It shows the first duct 8, the second duct 10 and the third duct 9, and also a jacket 11, which is optionally provided, destined to the circulation of a cooling fluid, for example water, defined from various coaxial tubes, collectively indicated with reference 12. Ducts 13 and 13' are used for the supply and removal of said fluid. The gases are supplied to the ducts through pipes, such as those indicated with 14. The first hole 7 is coaxial with the cylindrical body 3. The drawing also shows the converging-diverging portion 15 at the end of the first duct 8, particularly suitable in the case of supersonic gas outflow in the first duct 8. The converging-diverging, portion is preferably shaped in such a way as to convert the supply pressure into the discharge pressure following a hyperbolic tangent trend along the portion.

Either oxygen or a gas containing oxygen may be supplied in the first duct.

In the embodiment shown in the drawings, the head 2 presents two ring-shaped chambers 19 and 19' that serve for the distribution of the gas of the second duct and the gas of the third duct, these gases generally being a supporter of combustion and a fuel, e.g. oxygen and methane respectively (although it is also possible to change the order of the supplies, if necessary) to the second and third holes 5 and 5' that lead from them. Other embodiments are nevertheless possible, for example with more chambers destined for the distribution of the fuel and supporter of combustion connected to the exterior through a number of concentric hole distributions made in head 2.

Figure 3:
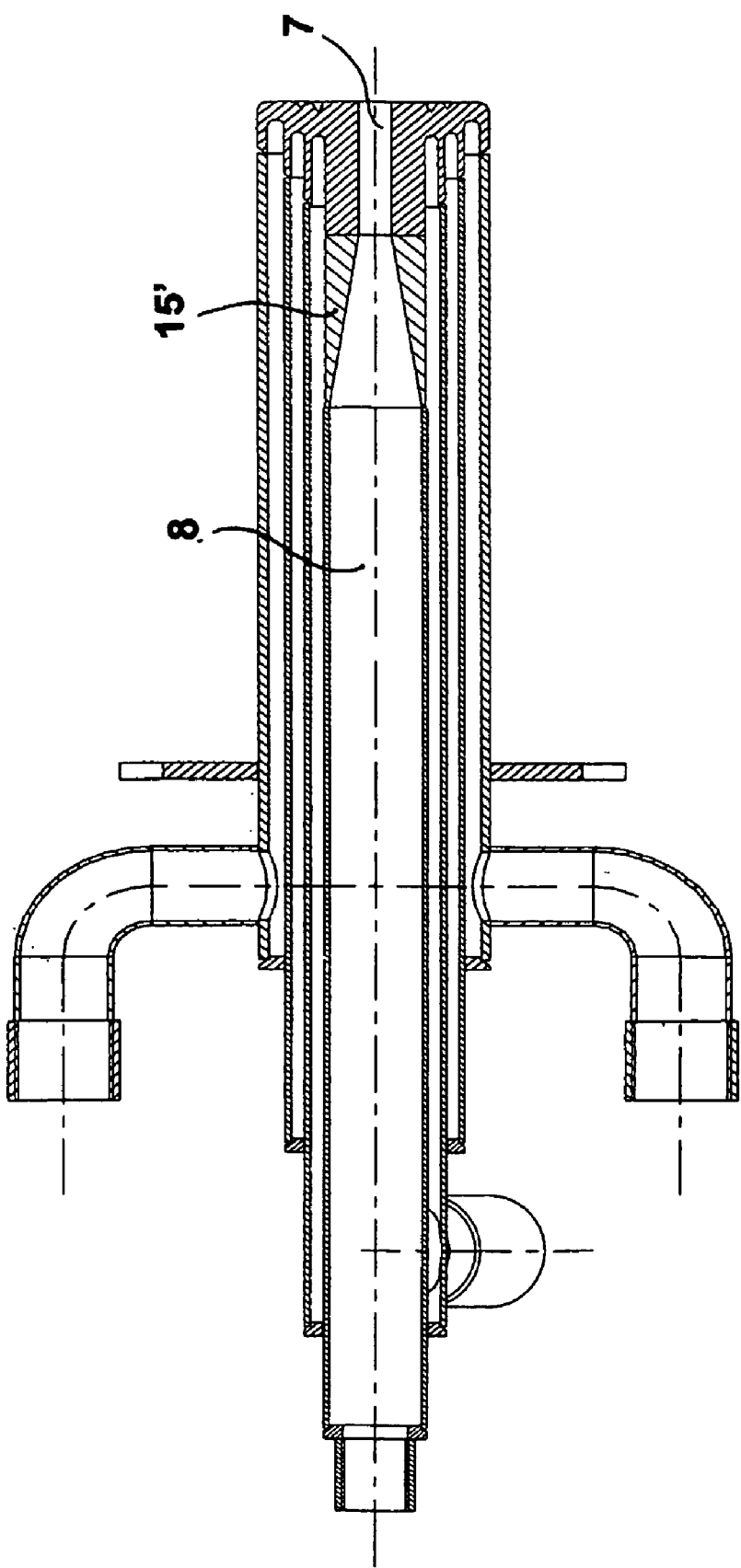

FIG. 3 illustrates a longitudinal section of a burner-injector manufactured according to an alternative embodiment of the invention. In this case, the converging-diverging portion is replaced by a simple converging portion 15'. The diameter of the first hole 7 and the first duct 8 are chosen to suit the characteristics of portions 15 or 15'.

Figure 4:
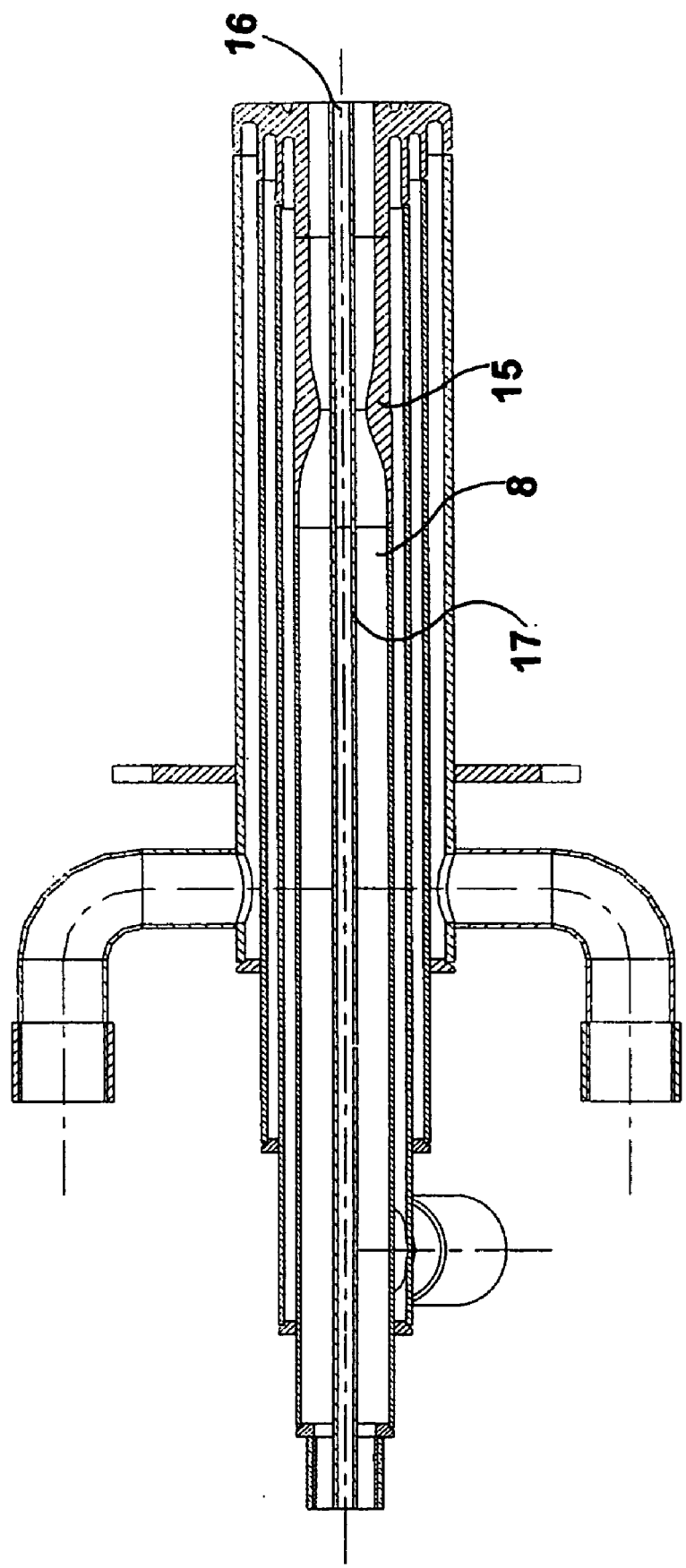
Figure 5:
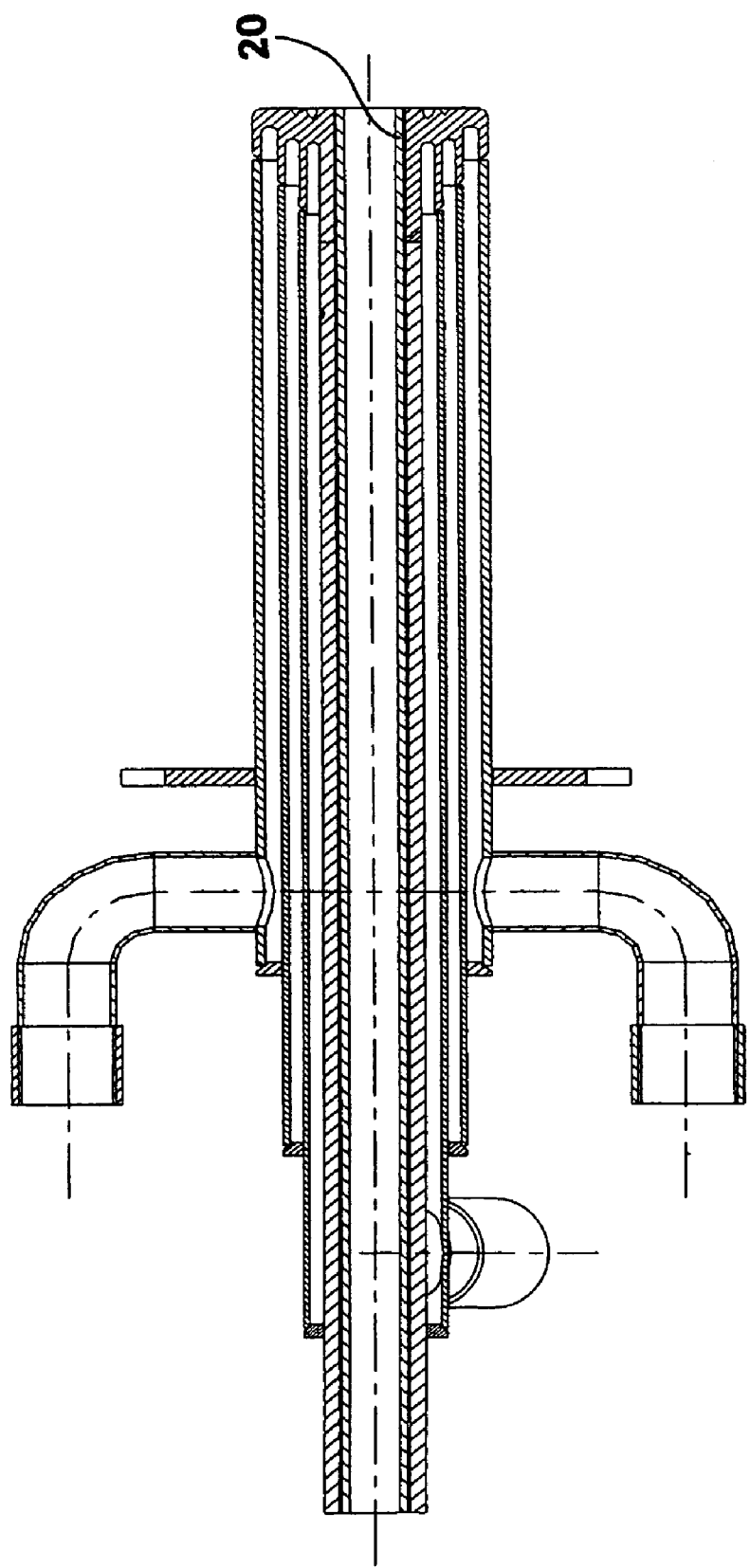

FIGS. 4 and 5 refer to a longitudinal section of embodiments featuring the converging-diverging portion and fourth duct 16, separated from the first duct 8 by tube 17, said fourth duct being used for the introduction of powders or granules (such as carbon or lime) transported, for example, by a suitable gas flow, and with the first duct straight without converging or converging-diverging portions, which can be used to inject powders together with the gas of the first duct. In this last case, the first hole may contain a consumable tube (20 in FIG. 5), made of steel or other suitable material, aimed at protecting the walls of the first duct of the device from the abrasive action of the powders or granules; according to an aspect of the invention, the introduction of the solids takes place in a gas flow, whose outflow from the injector-burner head is subsonic.

Other combinations are possible, according to process and plant requirements.

As mentioned previously, the second and third holes (if present) should preferably be distributed on two concentric circular crowns, as shown in FIG. 1. They can be divided into a number of groups spaced out by circular sectors of the head without holes. Said sectors are defined between two sides of an angle having the apex at the centre of the head (intersection between axis of the cylindrical body and the outer surface of the head) greater than the angle with the apex at the centre of the head and sides the straight lines passing through said centre and the centres of the two adjacent second or third holes (if present). Two or more groups may be present in order to form two or more flames which wind around the axis of the injector-burner, thus giving good heat blending and distribution. The direction of the second and third holes is such as to give the gas jets a direction component tangential to the axis of the injector-burner. In FIGS. 6a-6e different possible hole layouts are illustrated, which will give different types of flame in the injector-burner operating mode that provides injection of fuel and a supporter of combustion through such holes, and which can be chosen as required. With suitable hole layout and direction, flames of the desired shape will be obtained, shapes that can be adjusted to suit process requirements. Beside each type of head, the section of the flame generated is shown, normal to the axis of the injector-burner at a certain distance from it, a flame that is generated, in particular, by operating in "diffuse flame" mode as described below.

Figure 6:
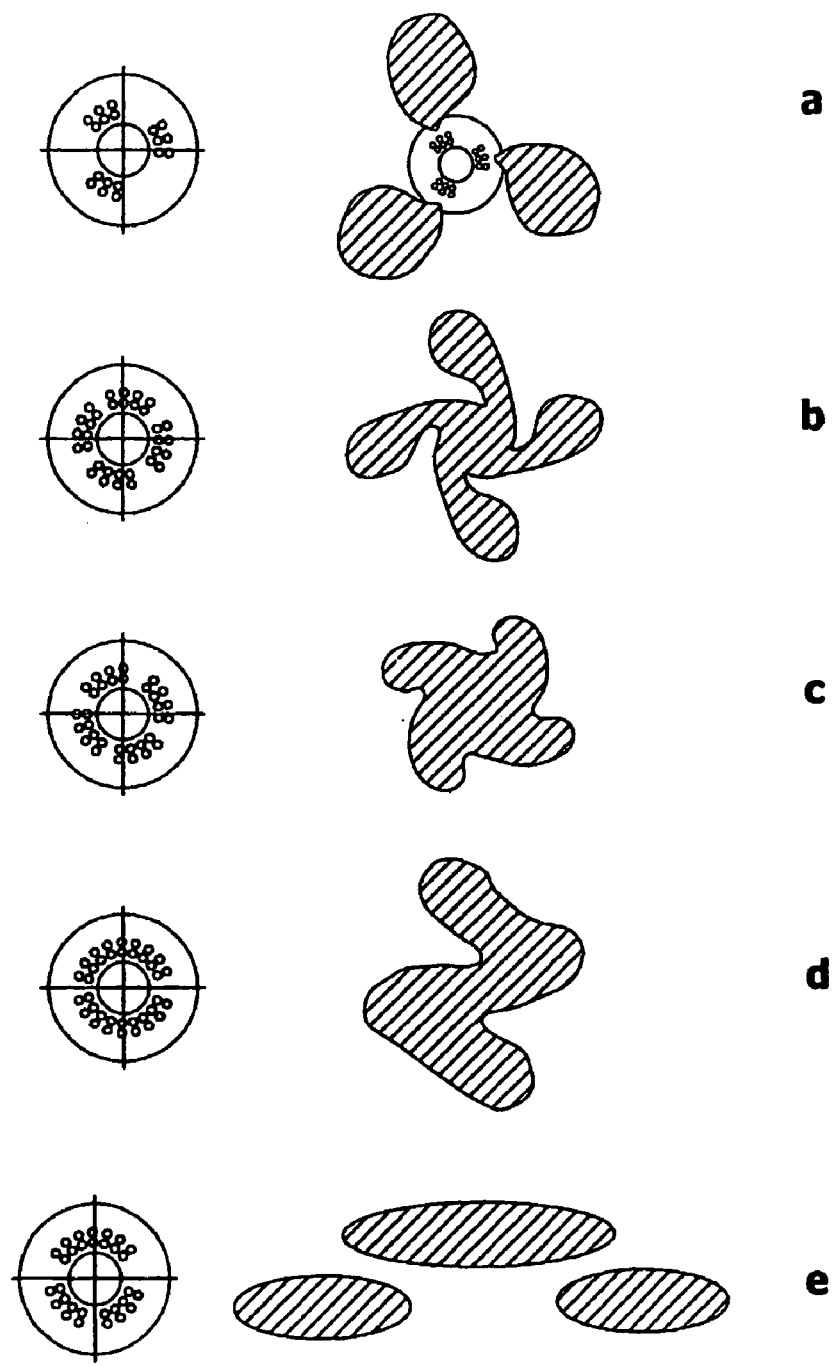
FIG. 6 illustrates various layout diagrams of the second and third holes of the head of an injector-burner according to the invention, together with the section normal to the axis of the injector-burner of the flame generated by them.

FIG. 6b illustrates a particularly preferred aspect of the invention.

The second and third holes can also be shaped to form converging or converging-diverging nozzles in order to give a supersonic outflow of the gases supplied therein.

A further preferred embodiment of a burner according to the present invention, particularly suitable for generating wide and flat flames. In this embodiment, the holes 4', 4" are grouped on the burner head in one or more first groups 5 of holes, with interspaces of angle γ, greater than the angle δ, separating two adjacent holes. Preferably two of these first groups 5 of holes are set on the head symmetrically and opposite to each other with respect to the head axis 6. The angles α', α" of these holes 4', 4" have values comprised between 5° and 60° and the angles β', β" of the holes 4', 4" have a value of substantially 0°, i.e. the hole axes are coplanar with the head axis 6. Moreover, the holes axes substantially intersect the burner axis 6. The angles α', α" and β', β" are the same as previously defined in the other embodiments described above.

In this manner the two opposite first groups of holes 4', 4" are suitable to produce two flames symmetrical with respect to the axis 6 and divergent from the head tip so that the two flame axes intersect the axis 6 of the burner behind the head. For example each hole 4', 4" of the first group is symmetrical with respect to the axis 6 to another hole 4', 4" of the second and opposite group of holes.

Figure 11:
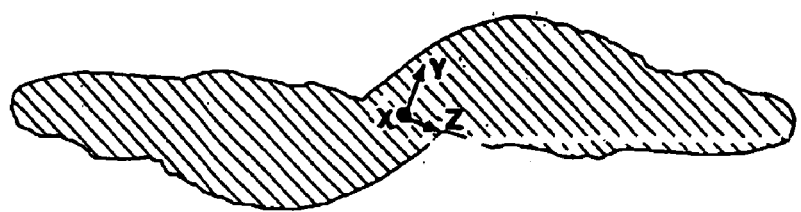
FIG. 11 shows a schematic view of a track of a flat wide flame produced by a further embodiment of the burner according to the invention.
Figure 12:
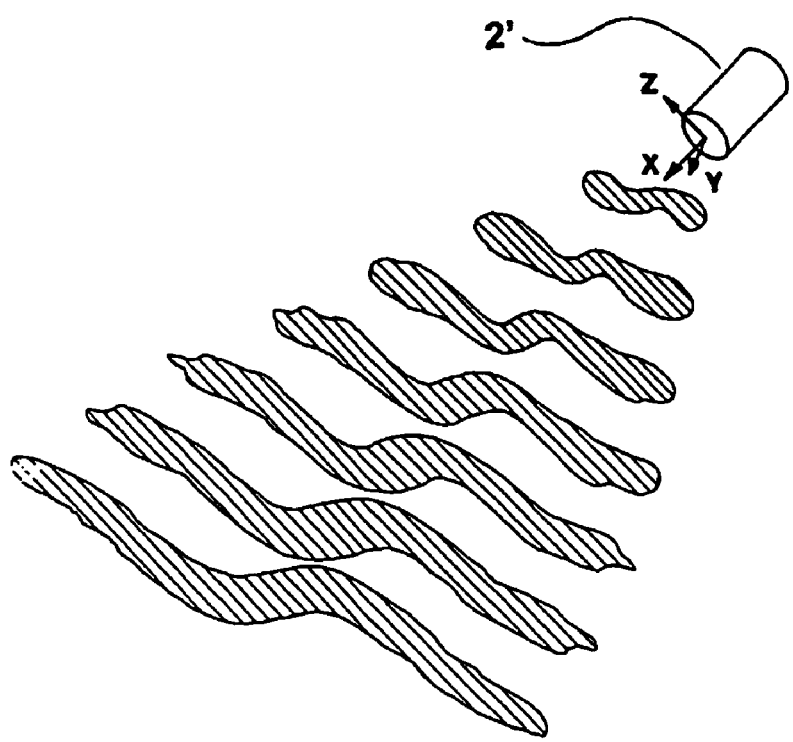
FIG. 12 shows a schematic perspective view of several tracks of the flame of FIG. 11 during its propagation.

In this embodiment the head 2 is provided also with one or more second groups of holes 5, whose holes 4', 4" are oriented like in the other embodiments previously described, i.e. both angles α', α", β', β" of these hole axes are different from 0° and thus are not coplanar with the axis 6 of the head 2. The two symmetrical flames interact with each other and with the other flames generated by the other groups of holes and produce a flame envelope corresponding to a unique, wide and approximately flat flame, as shown in the FIGS. 11, 12: FIG. 11 shows schematically a cross section of a flat flame obtained with the present embodiment, FIG. 12 shows several cross sections of a propagating flat flame In all the embodiments foreseen in this invention, the injector-burner can either be fixedly mounted on a wall or on a mechanical hand that allows it to be moved inside the melting furnace.

In the fixed wall-mounted installation, the axis of the injector-burner can be directed at will on both horizontal and vertical planes.

The injector-burner can be mounted on any state of the art wall or door lance (moved by mechanical hand). Its design and the performance of its jets are superior to the state of the art (particularly with regards to the supersonic oxygen thanks to the special nozzle design) and allow innovative use of such lances in relation to the state of the art.

It is to be noted that the state of the art lances of the known technique are forced to operate at typical distances of 300-350 mm from the bath due to the scarce coherence of the jet of oxygen they produce. Only by operating at such close distances the efficiency of oxygen penetration into the bath is acceptable.

In any case, the state of the art lances suffer from very limited reliability and duration due to the fact that operating so close to the molten bath, they are in critical thermal and physical conditions and can be directly affected by molten metal splashing.

If mounted at the end of a mobile lance, this injector-burner can provide high injection efficiency even if its point of insertion is further from the bath than the applicative state of the technique. It is possible to obtain injection efficiencies equal to or greater than the existing lances by operating at a distance of up to 1-1.5 metres. At these distances, the duration of the lance is far superior, as it makes it possible to operate further from the bath and is therefore less stressed by thermal and mechanical factors and is not at risk from molten metal splashing.

This peculiarity also makes it possible for the injector-burner to be applied in an intermediate installation mode between the fixed wall-mounted installation and the installation on a lance with a mechanical hand fitted with numerous degrees of freedom of movement, both modes being typical to the state of the art.

A compact mechanical hand with only one axial degree of freedom can be wall-mounted, which allows for the introduction of the injector-burner into the furnace according to its axial direction. In this configuration, the vertical and horizontal angles of installation of the injector-burner are not altered, and the distance between the injector-burner and the bath alone is varied.

This degree of axial freedom always permits maximum injection performance, irrespective of the current position of the liquid level, which depends on the quantity of metal charge in the furnace, the process phase and the state of wear of the refractory vat.

In any case, the minimum operating distance from the bath can, even in this case, be higher than that of a state of the art standard lance and therefore the problems of thermal—mechanical wear on the injector-burner are reduced. Typically, a distance of 500-600 mm from the bath can be chosen.

The axial stroke of wall-mounted introduction device (typically 1-1.5 meters) and, as a consequence, the external dimensions of the machine can therefore be reduced, when the injector-burner is brought into line with the wall during the loading phase.

We will now describe some operating modes of an injector-burner according to this invention, characterised in that it has second and third holes, distributed on concentric circular crowns.

In the "diffuse flame burner mode", the supporter of combustion is supplied from the third holes, or outer crown of holes and the fuel from the second holes or inner crown. The first central hole is fluxed with a minimum air flow-rate, in order to keep it clean. In this mode, the shape of the flame produced by the injector-burner is regulated by the physical effect of the swirl, caused by the inclination of the second and third holes that tends to cause a widening of the flame, which combines with the effect produced by the degree of separation of the fluxes produced by each set of holes, whose intensity depends on the angle of spacing between them.

Arranging the second and third holes in separate and spaced out groups produces an effect whereby the flame widens with continuity and does not close in on itself as the ring-shaped flame produced by a head without spacing between the groups of holes would.

FIG. 6b refers to a section of the diffuse flame produced by the preferred embodiment of this invention. The resulting flow presents four flame areas. A slight swirl effect is obtained that gives the jets a spatial helical configuration. The resulting flow presents 4 partially interacting flame areas, given that the swirl effect associated to the reduced separation between the sets of holes causes a recirculation of the combustion products towards the injector-burner axis area. In this way, 5 main fire directions can be identified. The opening of the four outer flames is lower than the geometric direction of the holes. In the space left free between the groups of holes, the environmental gas is able to flow, attracted by the action of the flows produced by the individual groups of holes, thus supplying the axial region of the injector-burner. The flows produced by each group can therefore expand spatially following the direction imposed by the inclination of the holes. The fluidodynamic connection between the surrounding environment and the axial area of the injector-burner in fact prevents the production of a central depression area, which would cause the flame to collapse.

The flame rotates in space, as it is moved further from the head, with a considerable increase in its efficiency.

Figure 9:
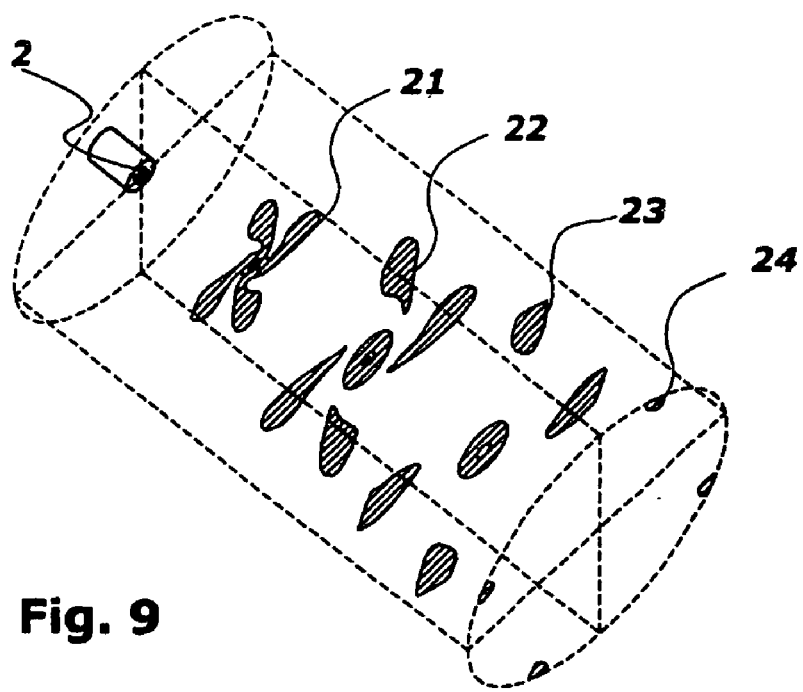
FIG. 9 illustrates a three-dimensional drawing of the evolution of the flame produced by the injector-burner in its operating mode generating a wide flame.

FIG. 9 illustrates the evolution of the flame produced by the preferred model of this invention in the diffuse flame mode, with sections 21, 22, 23 and 24 of it at 0.5, 1, 1.5 and 2 meters from the head 2 of the injector.

In general, the swirl effect, coupled with the fact that the supporter of combustion and fuel jets are directed in such a way as to collide in pairs, causes an excellent blend of the reagents for which the injector-burner in burner mode develops almost all of its power on smaller distances from the head than the state of the art burners (or injectors in burner mode).

Figure 8:
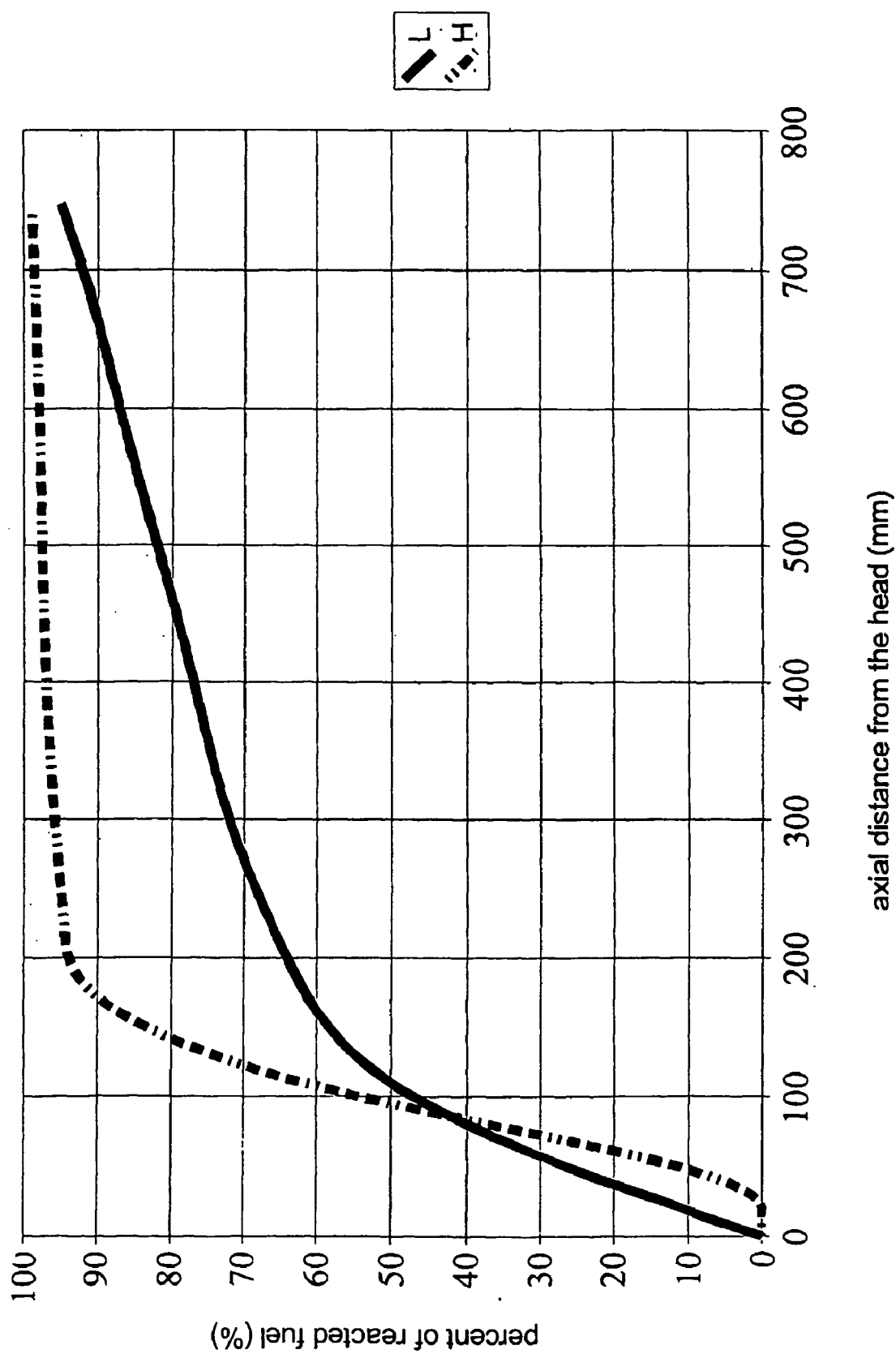
FIG. 8 illustrates the curve with the trend followed by the percentage of reacted fuel as a function of the distance from the head of an injector-burner conforming to this invention used in burner mode, in comparison with a state of the art device.

FIG. 8 shows a graph that permits a comparison between the percentage of fuel that has reacted with the supporter of combustion according to the distance of the head along the axis for an injector-burner according to the invention, represented by the H curve, and for a state of the art burner (or injector in burner mode) for application in EAF, represented by the L curve.

As one can observe from the graph, the injector-burner of this invention used in the burner mode exhausts the combustion reaction at 200-300 mm from the head, whereas a conventional burner (or injector-burner in burner mode) requires more than 700 mm to obtain the same exhaustion of the combustion reaction.

This flame behaviour, combined with its particular shape assumed in space, is at the origin of a series of advantages over the state of the art injector-burners in particular technical applications such as metal melting in EAF.

In particular, in addition to radiance, the heating effect of the metal charge takes place, through the convection of combustion products, which have an oxidising power on the charge, which is many times lower that the oxygen. The minimization of the flame region with non-reacted supporter of combustion implies the minimisation of the oxidising effect with regards to the charge.

Therefore, minimum oxidation of the charge is obtained, thanks to optimised blending, the absence of oxygen-rich areas and the low velocity of the flame produced. The melting of the metal charge is given by the heat produced by the flame and not by the oxygen lance cutting, in the presence of uniform heating and avoiding the oxidation of the metal charge, with gains in the global energy balance of the furnace's melting process.

The volume of the heated charge is $3 \div 4$ times greater that the concentrated flame burners (and injectors in burner mode) of the known type.

With the embodiments provided by the present invention, the flame produced has a frontal section many times higher than the state of the art injectors (ten or more times).

Flame injection is softer and better distributed, thus preventing the perforation of the charge until the electric arc area, avoiding disturbance to the arc and preventing the combusted gases from rising up along the electrode, without passing through the metal charge.

It is possible to pre-heat the entire charge ring at the base of the column in the furnace without leaving areas of discontinuity with a reduced number of units installed.

The hot gases produced by combustion move up inside the charge more slowly and in a more uniform way and therefore have more time to transfer their energy to the metal charge.

Typically, the maximum power of a state of the art burner (or injector in burner mode) beyond which its usage in EAF becomes inefficient and causes the problems mentioned above, is around $2 \div 3$ MW.

The design of the injector of the present invention is such to produce a very diffuse flame obtained as the sum of a number of individual partially interacting flames with different directions in space. Typically, 4-5 main flame directions can be recognised. In this way, each injector can introduce into the furnace a power $2 \div 4$ times higher than the injectors of the known kind without risking the concentration of energy in punctual areas only and thus maintaining a continuous pre-heat on the entire circumference of the furnace. In burner mode, the injector described herein can reach $8 \div 10$ MW and beyond, without encountering the disadvantages that characterise devices of the known type. It is therefore possible to introduce more power into the furnace without increasing the number of units installed and therefore the complexity of the machine.

In conformity with the invention, it is possible to create burners that generate a flame as the sum of a number of flows/flames with a predefined degree of independence between them, characterised by the geometrical separation of the sets of holes. The shape of the flame in space is regulated by the development and opening of the swirl effect of the holes and by the spacing between groups.

One significant embodiment of the invention is that in which the second and third holes are arranged in a regular way along the circumference and are not grouped together. If they are distributed in a uniform and continuous way around the axis of the injector-burner and are brought together, at equal inclination of the supporter of combustion and fuel holes, the presence of the swirl effect alone will produce a reduced widening of the flame. In fact, in this case, the flame widens at the outlet of the head according to the vector induced by the swirl, but close to the head, it tends to close in on itself. This occurs because, at a certain distance from the head, the momentum of the jets is dissipated and is not able to maintain the depression in the axial area with the consequence that the flame closes in on itself, thus becoming concentrated once again. This embodiment therefore produces a concentrated flame, but offers the advantage of improved reagent blending at outflow from the head compared to injectors of the known type.

In the "concentrated flame burner mode", the supporter of combustion is supplied from the first central hole and the fuel from the inner crown of third holes. The outer crown of second holes is fluxed with a minimum flow-rate of air in order to keep it clean. In this way, the natural widening of the flow produced by the spatial direction of the crown of fuel holes is inhibited by the momentum of the central jet, which attracts the entire flow-rate of fuel injected around itself. A strongly directional flame guided by the axial jet of the supporter of combustion is therefore produced.

Figure 10:
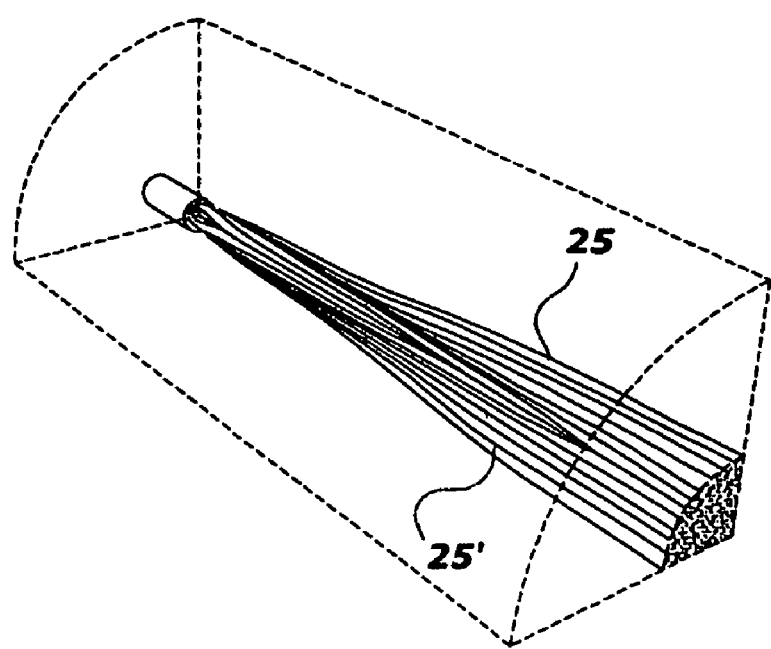
FIG. 10 presents a three-dimensional drawing of the evolution of the flame produced by the injector-burner in its operating mode which forms a concentrated flame.

FIG. 10 shows to two axial sections 25 and 25', which are between them orthogonal, the direction of the flame produced by the injector described herein in the concentrated flame mode.

The flow of supporter of combustion is attracted by the axial jet, but preserves its helical direction induced by the spatial orientation of the holes. This spiral development of fuel flow wrapped around the axial jet of the supporter of combustion increases the efficiency of the injector in concentrated flame burner mode.

The changeover from "diffuse flame burner mode" to "concentrated flame burner mode" takes place during the process when the melting of the metal charge reaches the point in which the level of the charge drops below the level of installation of the injector-burner.

With the "concentrated flame burner mode" it is possible to obtain a strongly directional, high density and power concentration flame that makes it possible to melt the residual solid charge and start to oxidise the charge present at the level of the liquid bath. Changeover to this mode is made necessary by the charge in shape of the charge inside the furnace, for which in this phase, the diffuse flame would cause a strong dispersion of heat directly towards the walls of the furnace and the fume system. The concentrated flame on the other hand, permits the transfer of all the heat developed by combustion to the residual charge to be melted and to the bath.

Changeover from the "diffuse flame burner mode" to the "concentrated flame burner mode" can also take place gradually, using the "hybrid burner mode". In the hybrid mode, the supporter of combustion is supplied both by the central nozzle and the outer crown of holes, whereas the fuel is supplied by the inner crown of holes. In this mode, it is possible to obtain all the intermediate flame shapes between the "diffuse" and the "concentrated" flame simply by varying the ratio of the supporter of combustion flow-rate injected by the central nozzle and the flow-rate of the supporter of combustion injected by the outer crown of holes.

Flame regulation can therefore take place gradually.

In the "supersonic oxygen injection mode", the oxygen is supplied through the central nozzle, whereas the crowns of holes are fed with the minimum air flow-rate. Once the charge has completely melted and has been completely transformed into the liquid state, the bath must be refined by injecting high velocity oxygen at a great depth.

This function is performed by the injector-burner, which is fitted with a nozzle on its axis that permits the injection of the chosen flow-rate of oxygen (from 600 to 10000 $Nm^3/h$ according to the size of the melting furnace and the specific process requirements) with a velocity corresponding to Mach 2 or higher.

In this mode, the jet of oxygen presents higher characteristics than the known type, especially if the shaped converging-diverging portion is included in the first duct.

The design of said nozzle is such to guarantee an injection efficiency higher than that of the state of the art even with considerable installation distances from the bath (greater than 1.5 meters).

The central converging-diverging nozzle is preferably configured with an aerodynamic profile in order to convert the total supply pressure (typically higher than 10 bar) into velocity, thus adapting to discharge pressure, following a hyperbolic tangent law such as:

$$f(x) = a \cdot th(c - b \cdot x) + d$$

in which:

$$a = \frac{p_0 - p_s}{2};$$
$$b = \forall;$$
$$d = \frac{p_0 + p_s}{2};$$
$$c = ath\left(\frac{1-d}{a}\right);$$
$$th(\kappa) = \frac{e^\kappa - e^{-\kappa}}{e^\kappa + e^{-\kappa}};$$
$$ath(\gamma) = th^{-1}(\gamma).$$

when $p_o$ is supply pressure, $p_s$ is discharge pressure, x is the length travelled by the gas in the nozzle portion, b represents an arbitrary factor that determines the degree of draft of the profile around the throat section and can take any value (usually between 1 and 3) and f(x) is a function to which the pressure in the various sections of the nozzle remains proportionate.

This type of profile guarantees perfect oxygen expansion inside the nozzle until it reaches the outlet condition. On the outlet section all the thermodynamic quantities and the velocity profile are extremely uniform thus guaranteeing maximum supersonic jet performance in terms of jet coherence. As a consequence, the jet of supersonic oxygen can penetrate deep down into the liquid bath, even if the injector is installed on the furnace wall at a distance of more than 1,5 meters from the bath. The coherent region (in which the velocity of the gases along the axis of the jet, coinciding with that of the injector-burner, does not diminish, i.e. it remains equal at least for 99% to that of the gas on the surface of the injector-burner head) of the jet produced by this type of converging-diverging nozzle is typically 2-3 times longer than the state of the art injectors. The injector of this invention can produce perfectly coherent jets of oxygen up to distances of 2÷2.5 meters.

This peculiarity allows efficient oxygen injection deep into the bath, which leads to an acceleration of the refining process. Moreover, thanks to its coherency, the momentum transmitted to the liquid bath reaches a maximum as does the stirring and the mixing of the liquid bath.

When the injector is orientated in such a way as to produce a jet that is not orthogonal to the bath (on the vertical plane) and/or not directed towards the axis of the furnace (on the horizontal plane), a strong bath stirring effect on the vertical and/or horizontal plane is caused. This effect gives the liquid a great chemical and thermal uniformity, with obvious advantages with regards to both product quality and refining speed.

During the injection of supersonic oxygen from the central nozzle, the two crowns of second and third holes are fed with a minimum quantity of air in order to keep the holes clean. This air flow wraps itself around the jet of oxygen in a spiral way, being attracted to it by the Venturi effect, exactly the same way as happens in the concentrated flame burner mode. The presence of this spiral flow of air around the jet of oxygen does not damage the coherency of the jet, in fact it slightly improves it, given that the shear rate drops in relation to the environment and therefore the dissipation of kinetic energy of the jet due to viscous friction.

It is also possible to adopt a "hybrid supersonic oxygen injection mode" in which, in addition to the injection of supersonic oxygen from the central nozzle, the burner function is kept on the crowns of holes or only methane is injected by the inner crown of holes. The flame produced by fuel and supporter of combustion (injected by the inner crown of holes and the outer crown of holes in the first case and by the inner crown of holes and central nozzle in the second respectively), is attracted by Venturi effect to the supersonic oxygen jet and it wraps it self around it in a spiral. The presence of this helical flame around the oxygen jet further increases jet coherency, given that in addition to reducing viscous dissipation, it produces a high temperature fluid buffer around the jet. Thanks to their high temperature, the burnt gases have a low density and can therefore easily be dragged by the oxygen jet without significantly reducing kinetic energy.

The presence of this spiral flame that wraps itself around the oxygen jet makes it possible to reach coherent jet lengths higher than the applications of the known technique in which oxygen jets are protected by a purely axial ring-shaped flame devoid of circumferential components.

When the flow-rate of a fuel such as methane, injected around supersonic oxygen, is such that combustion does not exhaust itself along the free jet, a quantity of non-reacted fuel reaches the slag and the molten bath. In such conditions, air or oxygen can be injected by the outer crown of holes in order to perform a post-combustion reaction that will now be described in detail. The oxidising effect induced by the supersonic oxygen in the area of impact on the bath causes high local temperatures of the molten metal (>1800° C.). At such temperatures the fuel that arrives on the bath gives the cracking reaction (for example if the fuel is methane):

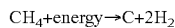
$$CH_4 + energy \rightarrow C + 2H_2$$

and it therefore divides into carbon and hydrogen. The reaction is endothermic and therefore cooling takes place in the area to avoid excessively high molten metal temperatures (and therefore metal evaporation with a consequential drop in furnace performance) and favours slag foaming. The carbon carburises the liquid bath, whilst the hydrogen reduces the oxides present above the level of the bath and in the slag. This reduction reaction also interests the metal oxide present at the level of the bath and permits an increase in the yield of the melting process, by recovering metal that would otherwise be lost in the slag. The part of the hydrogen that is unable to find oxides to reduce burns with the part of the oxygen injected that does not penetrate into the bath or with air (or oxygen) injected together with the jet from the injector's outer crown of holes. This post-combustion hydrogen reaction:

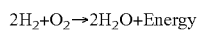
$$2H_2 + O_2 \rightarrow 2H_2O + Energy$$

releases energy and a large quantity of gas (water vapour) that rise up through the slag causing it to foam. The same oxide reduction reaction, in part carried out by the hydrogen causes the production of a large quantity of water vapour. Slag foaming is very efficient and joins together with that caused by the rise of the CO produced by the decarburation of the bath. Overall, one observes a rapid reswelling of the slag that has beneficial effects on the thermal balance of the process and on the efficiency of the electric arc.

Hydrogen post-combustion may also take place above the slag should the air or oxygen flow produced by the injector's outer crown of holes be reduced in such a way as to not penetrate into the slag.

The operating mode described above can be described as "hybrid oxygen injection—carburation—reduction and post-combustion mode". This phase is applied in flat bath conditions.

The same injector-burner can also be used extremely effectively in the "pure carburation mode". This takes place when the fuel is injected through the converging-diverging central nozzle. In this case, if the flow-rate of the fuel is sufficiently high (depending on the size of the nozzle and typically higher than 100 Nm3/h) the fuel jet is very compact, has high momentum and can even reach the supersonic regime. The penetration of the fuel in the bath is therefore very efficient. In this case too one has the fuel cracking reaction in carbon and hydrogen. The carbon carburises deep within the bath, whilst the hydrogen reduces the oxides present at liquid bath level and in the slag and subsequently returns up through the slag where or above which it can give post-combustion with an air flow (or oxygen) wrapped around the axial fuel jet and produced by one or both of the injector's crowns of holes. This phase is also applied in flat bath conditions. The regime of gas injection containing fuel can be sub- or supersonic according to requirements and the conformation of the first duct.

The embodiments of the present invention previously described and illustrated in FIGS. 2, 3, 4 and 5 have "diffuse flame burner", "concentrated flame burner", "hybrid burner", "Hybrid oxygen injection—carburetion—reduction and post-combustion" and "pure carburetion" modes as described above.

More particularly, the embodiments illustrated in FIGS. 4 and 5 allow the injection of solid material in powders or granules (such as carbon and lime), having a nozzle on the axis dedicated to the injection of such materials during the refining phase. In particular, the embodiment illustrated in FIG. 4 permits the simultaneous injection of gas (such as oxygen) in a supersonic regime and material in powder or granules (such as carbon or lime) as it bears a converging-diverging nozzle on its axis for oxygen, with an insert inside the tube for solid material injection.

In any case, the central nozzle may also be used for injecting a gas containing oxygen in order to operate. the post-combustion of the carbon monoxide released from the liquid bath during the refining phase.

Generally speaking, for all the embodiments of the injector-burner provided by this invention and for all the operating modes, there is no limit to the stoichiometric relations between the fuel and the supporter of combustion that can be used.

The invention also concerns a heating, melting and metallurgic treatment process of metallic material in a melting furnace, in particular electric arc furnaces, including the supply, to the first duct of an injector-burner as described above of an oxygen-containing gas, to the second duct of a gas containing a fuel, such as methane or natural gas, and a gas containing oxygen to the third duct, if provided. This invention also contemplates methods for introducing gas in a melting furnace with gas supply in different ways, as will be described below, for both the heating of the metallic material and its decarburation or carburation.

As demonstrated, the device resolves the typical problems of the state of the art, having the possibility to work in burner mode during the melting phase, by creating a very diffuse flame in the initial phase of the process and a concentrated flame in the conclusive phase of melting, and subsequently to work in supersonic oxygen or carbon or lime injection mode during the refining of the liquid bath.

The changeover between these various phases and injection and combustion modes takes place by simply regulating the capacities of the injector's various nozzles.

As an example, we will now give a possible programme of iron scrap melting process in an Electric Arc Furnace, using an injector-burner with a third duct as described above, according to the present invention.

Figure 7:
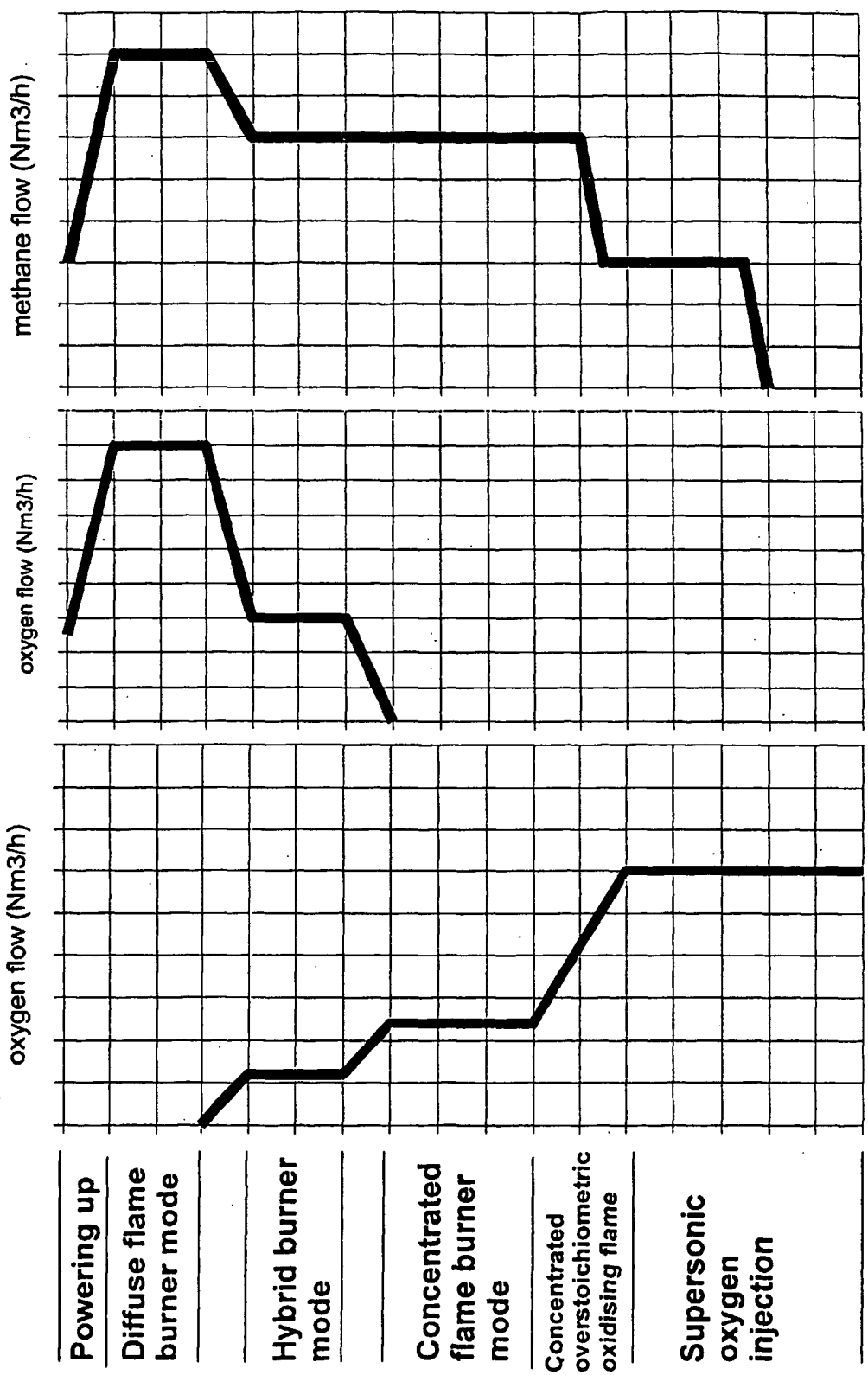
FIG. 7 illustrates the pattern of the gas flow rates supplied to the injector-burner described herein in the various phases of an iron scrap melting process in an electric arc furnace.

FIG. 7 illustrates the profiles of the fuel and supporter of combustion flow-rates in the various phases of the operation. The profiles serve as examples only and have a relative value. In general it is not possible to give absolute flow-rate and time values as they depend on the size of the furnace, the power of the arc installed and the number of chargings to be made (single or multiple buckets). However, the usage logic of the injector-burner remains unchanged.

Step 1: Powering Up

The burner is powered up a few tens of seconds later than the electric arc in order to ensure that the conditions of inflammability of the mixture of fuel and supporter of combustion have been reached. The fuel flow-rate in the second duct is initially set at 30-50% of the nominal power and a slightly reducing combustion ratio is maintained, with oxygen supplied in the third duct (in the case of $O_2/CH_4$ ratios of approximately 1.6:1.8 are adopted, i.e. 20-40% less than the stoichiometric ratio).

This is to obtain a flame that is suitable for heating but that is non-aggressive towards the equipment in order to avoid damage to the cooled, non-cooled and refractory panels and the device itself. After working in this way for approximately 30", the burner's gas flow rates and therefore its power can be increased to 80% of the nominal value and an almost stoichiometric ratio is used (in the case of $O_2/CH_4$ ratios of approximately 1.9-2.0 are adopted). During this time, the central duct fitted with a converging-diverging nozzle is fed with compressed air or oxygen. The flow-rate is thus calibrated so that the outlet velocity of the gas is at. least 80-120 m/s and pressure is 0.4-0.8 bar. In the case, for example, of a nominal 300 $Nm_3/h$ nozzle, 300-350 $Nm_3/h$ can be introduced. The primary aim of such fluxing is to avoid occlusions caused by steel splashing. However, in this case, an energy valence is also obtained as the oxygen contained in the fluxing gas co-operates with the flame, thus further improving the efficiency of combustion;

Step 2: Diffuse Flame Burner Mode

Once the burner has been switched on and the scrap has been heated to a temperature of 500-600° C., it is possible to rapidly reach full flame power in stoichiometric ratio. A slight delay in increasing power should be observed when using a very heavy or closely packed charge (in other words very large pieces or ones that have a very high lump density). It is possible to apply a flame strength 2-4 times those commonly used in conventional applications. The individual flames that constitute the global effect of the burner are distributed over a greater area of scrap, thanks also to the variation in shape caused by the variation in flow-rate as described above, in such a way that the specific thermal flow remains unchanged compared to conventional applications, although a far higher total thermal power is applied. High combustion efficiency and rapid fuel and supporter of combustion blending cause limiting properties to flame oxidation. The abatement and melting of the charge in the case in which it is particularly heavy and closely packed can be aided by the variation in the combustion ratio.

Step 3: Hybrid Burner Mode and Modulation of the Stoichiometric Ratio

The temperature of the scrap rapidly increases with the flame and the scrap gradually descends to bath level, thus exponentially reducing the efficiency of the diffuse flame in terms of heat transmission by direct radiance and surface convection.

Therefore a progressive changeover is made from the diffuse flame to the concentrated flame by starting to transfer a part of the oxygen flow-rate from the outer crown of holes to the central nozzle.

Moreover, by increasing the combustion ratio, the progressive increase in free oxygen can allow an even faster scrap melt. However, in this case carbon must also be locally injected; the iron oxide produced during this phase drips downwards and collects in the vat positioned below the injector. The speed with which iron oxide is produced in this phase increases rapidly, thus consequentially requiring the addition of carbon and lime in order to protect the refractory from chemical erosion and in order to moderate the iron's oxidizing reaction.

Step 4: Concentrated Flame Burner Mode

Once the charge has been melted by the walls and reaches the level of the liquid bath, the changeover to the concentrated flame burner mode must be completed. The subsequent aim is to melt the quantity of scrap that is found at a distance from the head of the injectors towards the centre of the furnace. It is very dangerous to hit the scrap with a fast, concentrated jet of oxygen as it would create splashes of iron oxide or the jet of oxygen could be reflected backwards towards the refractory panels. It is therefore not possible in this phase to use an injection of supersonic oxygen to oxygen lance cut the residual scrap present at bath level. However, this phase does require a long, concentrated flame, but one that does not have an excessive momentum. In the concentrated flame burner mode, the injector-burner of the present invention satisfies this requirement and has a very directional thermal and chemical action that is able to transfer heat to the charge present below its installation level. By adjusting the stoichiometric ratio, it is also possible to exert an oxidizing action on the residual charge in order to accelerate the reaching of complete melting.

Whilst the injector is in use in-the concentrated flame mode, the first decarburation and oxidising reactions take place. Both the flow of oxygen flowing out from the central nozzle and the fluxing air or oxygen allow the post-combustion of the CO that has formed. The changeover of this step of the procedure is crucial for preparing the last step efficiently.

Step 5: Refining

The last step is aimed at accelerating all the oxidising reactions of the liquid steel bath and the decarburazion reaction in particular. In this case the nominal flow-rate is applied from the central converging-diverging nozzle. During this phase, the most important parameter to be monitored is the efficiency of the jet, as it is necessary to obtain high reaction speed, blending by mass transport, low oxygen concentrations in the slag and high decarburation inside the bath in order to obtain the best possible operating results.

During the refining phase, the injection of supersonic oxygen can be accompanied by the injection of methane through the inner crown of holes, given that the effect of rotation in this latter around the oxygen jet and its combustion with the oxygen injected from the central nozzle or even from the outer crown of holes promotes the coherency and penetrating action of the supersonic jet into the bath.

The higher flow-rate methane injection can also be used to obtain a carburation and reduction effect in agreement with the "hybrid oxygen injection—carburation—reduction and post-combustion mode" described above.

In some cases, oxygen injection through the central nozzle can be replaced for short intervals by the injection of methane through the central nozzle, following the "pure carburation mode". This practice makes it possible to decarburise the bath and recover metallic yield, thanks to the local reducing effect of the products in which the methane cracks.

FIG. 7 schematically illustrates the series of the injector's operating modes throughout the melting process. Oxygen flow-rate #1 is that injected by the central converging-diverging nozzle, whereas oxygen flow-rat #2 is that injected by the outer crown of holes. The methane flow-rate refers to the inner crown of holes.

One can recognise the two diffuse and concentrated flame modes used one after the other and separated by a hybrid phase in which an intermediately-shaped flame is created. At the end of the process, a supersonic oxygen injection is performed for bath decarburation. This phase can be divided into two separate modes: the first with a methane injection around the jet of oxygen (in order to increase jet coherence and even give a superficial carburation effect to the bath), the second with the injection of supersonic oxygen alone.

The profiles given are absolutely general and can be applied as a principle for any type of furnace charging (single or multiple buckets) and they refer to an injector using methane and oxygen as fuel and supporter of combustion respectively.

The invention claimed is:

1. Injector-burner comprising a cylindrical body (3) defining a first longitudinal axis (6), the cylindrical body comprising
   a first central duct (8) arranged along said first axis (6),
   at least one second ring-shaped duct (10), arranged around said first central duct (8),
   a third ring-shaped duct (9), arranged around said second ring-shaped ducts (8),
   a head (2), fixed to one end of said body and provided with at least one first central hole (7), coaxial to the first longitudinal axis (6) and connecting said first central duct (8) with the outside of the cylindrical body (3),
   the head (2) being provided with second and third through holes (5) connecting respectively said second and third ring-shaped ducts (9, 10, 11) with the outside of the injector-burner,
   the second through holes (5) defining respective second axes, wherein each second respective axis forms a first angle with a plane passing through the first axis (6) and an intersection point of said second respective axis with an external surface of the head (2) and wherein each second respective axis defines a projection on said plane forming a second angle with said first axis (6),
   characterised in that the second and third through holes are divided into several groups, the groups being reciprocally separated by circular sectors of the external surface of the head without holes, whereby the circular sectors have their apexes on the first axis (6) and their angles are greater than the angular distance between two adjacent second through holes.

2. Injector-burner according to claim 1, wherein each of the said third through holes define respective third axes forming a first angle with a plane passing through said first axis (6) and the intersection point of said third respective axis with the external surface of the head (2) and having a projection on said plane forming a second angle with said first axis (6).

3. Injector-burner according to claim 2, wherein one or several of said groups of second and third through holes (5) comprise holes whose axes have first angles with a value different from 0° and second angles with a value of 0°.

4. Injector-burner according to claim 3, wherein said several groups of second and third through holes (5) are placed on the burner head symmetrically and directed in respective diverging directions with respect to the first axis (6) so that said several groups of second and third through holes (5) are suitable to produce respective flames in diverging directions and substantially symmetrical with respect to said first axis (6).

5. Injector-burner according to claim 2, wherein said first and second angles of the respective axes of second and third through holes have a value comprised between 5 and 60°.

6. Injector-burner according to claim 5, wherein second respective axes and third respective axes, crossover one another in pairs outside the injector-burner.

7. Injector burner according to claim 6, wherein the second and third holes are distributed on two circular crowns concentric with the first axis (6) of the cylindrical body.

8. Injector-burner according to claim 7, wherein said first central duct (8), or the corresponding first central hole (7), comprises a portion having a shape of a converging or converging-diverging nozzle (15, 15').

9. Injector-burner according to claim 8, wherein an outflow of supersonic gas from the nozzle is provided with a variation in gas pressure along the length of the nozzle (15, 15') according to a hyperbolic tangent function.

10. Injector-burner according to claim 9, wherein there is provided a fourth duct (16), inside the first central ducts (8), and substantially coaxial with it, for supplying solid or liquid components, dispersed in a gas.

11. Injector-burner according to claim 10, wherein the second and/or third through holes are shaped to a converging or converging-diverging nozzle.

12. A method for introducing one or more gases into a melting furnace for metals, wherein said gases are introduced in the metal through an injector-burner according to claim 1.

13. The method according to claim 12, comprising the step of supplying an oxygen-containing gas to the first duct of said injector-burner and a fuel-containing gas to the second or third duct, so as to generate a flame outside the injector-burner.

14. The method according to claim 13, comprising the step of ejecting oxygen-containing gas from the first hole of said injector-burner at supersonic velocity.

15. The method according to claim 14, comprising the step of making part of said fuel reach unburnt a melt inside the furnace.

16. The method according to claim 12, comprising the step of supplying an oxygen-containing gas to the third duct of said injector-burner.

17. The method according to claim 12, comprising the step of supplying a fuel-containing gas to the third duct and an oxygen-containing gas to a second duct.

18. The method according to claim 12, comprising the step of supplying an oxygen-containing gas from the first duct of the injector-burner.

19. The method according to claim 18, comprising the step of ejecting gas from the first hole of the injector-burner at supersonic velocity.

20. The method according to claim 19, comprising the step of producing a coherent length of a gas jet from said first hole greater than the distance of the head of the injector-burner from the surface of a melt contained in the furnace.

21. The method according to claim 12, comprising the step of introducing a solid in form of powder or granules through the injector-burner first duct.

22. The method according to claim 21, comprising the step of introducing the solid together with a gas stream, whose outflow from the first hole of the injector-burner is subsonic.

23. The method according to claim 12, comprising the step of introducing a solid in the form of powder or granules through the fourth duct.

24. The method according to claim 12, comprising the step of supplying a fuel-containing gas to the first duct of said injector-burner in subsonic or supersonic regime.

25. The method according to claim 24, comprising the step of making-part of said fuel reach unburnt the surface of a melt inside the furnace.

26. Injector-burner according to claim 4, wherein the second and third holes are distributed on two circular crowns concentric with the first axis (6) of the cylindrical body.

27. Injector-burner according to claim 26, wherein said first central duct (8), or the corresponding first central hole (7), comprises a portion having a shape of a converging or converging-diverging nozzle (15, 15').

28. Injector-burner according to claim 27, wherein an outflow of supersonic gas from the nozzle is provided with a variation in gas pressure along the length of the nozzle (15, 15') according to a hyperbolic tangent function.

29. Injector-burner according to claim 28, wherein there is provided a fourth duct (16), inside the first central duct (8), and substantially coaxial with it, for supplying solid or liquid components, dispersed in a gas.

30. Injector-burner according to claim 29, wherein the second and/or third through holes are shaped to a converging or converging-diverging nozzle.

31. Injector-burner according to claim 30, wherein said injector-burner is mounted on a lance fitted with a mechanical arm.

32. Injector-burner according to claim 11, wherein said injector-burner is mounted on a lance fitted with a mechanical arm.

33. The method according to claim 14, comprising the step of supplying a fuel-containing gas to the second duct of the injector-burner.

34. The method according to claim 16, comprising the step of supplying a fuel-containing gas to the first duct of said injector-burner in subsonic or supersonic regime.

35. The method according to claim 34, comprising the step of making part of said fuel reach unburnt the surface of a melt inside the furnace.

* * * * *